Patented May 12, 1931

1,804,398

UNITED STATES PATENT OFFICE

SIDNEY M. CADWELL, OF LEONIA, NEW JERSEY, AND ALEXANDER THEODOROVICH MAXIMOFF, OF NEW YORK, N. Y., ASSIGNORS TO THE NAUGATUCK CHEMICAL COMPANY, OF NAUGATUCK, CONNECTICUT, A CORPORATION OF CONNECTICUT

ALDEHYDE-AMINE CONDENSATION PRODUCTS AND PROCESS OF PREPARING SAME

No Drawing.    Application filed October 15, 1925.   Serial No. 62,655.

This invention relates to an improved condensation process and to the products thereof, more particularly as applied to the condensation of aldehydes and basic nitrogenous materials for use as vulcanization accelerators. In recent years the use of powerful organic accelerators of vulcanization has become widespread, and among these the condensation products of aldehydes and basic nitrogenous materials have gained considerable favor by reason of cheapness as compared with some of the other accelerators, powerful accelerating qualities, good aging, and safety from burning or scorching on the mill. In patent to Cadwell, No. 1,417,970, May 30, 1922, there are disclosed a large number of such condensation products and methods of making. The present invention relates to an improvement in the method of making the condensation products by which their accelerating strength is greatly increased or the cost of the product reduced or both.

An object of our invention is to provide an improved method for forming condensation products of aldehydes and basic nitrogenous materials. Another object is to provide improved vulcanization accelerators. Other objects will appear from the detailed description.

The invention consists broadly in combining an aldehyde and a basic nitrogenous material at a relatively high initial temperature and substantially maintaining the temperature during the reaction. The invention also consists in combining definite proportions of the ingredients at an elevated temperature. It may also comprise steam distillation of the condensation product. The invention further consists in the products of the process.

In carrying out one form of the invention a quantity of the desired aldehyde may be disposed in a vessel provided with suitable heating apparatus and after the material has reached the desired temperature the basic nitrogenous material is slowly added while maintaining the temperature. Instead the basic nitrogenous material may be heated and the aldehyde slowly added thereto, or if desired both ingredients may be initially heated. The heat is maintained until the reaction is completed, after which the condensation product may be steam distilled, that is, steam passed through the product to remove volatile impurities, water and unchanged amine and aldehyde.

As a specific example of the process 576 lbs. of commercial heptaldehyde were placed in a suitable vessel equipped with steam coils and a stirrer and heated to about 140° C. 218 lbs. of aniline were then slowly run into this hot heptaldehyde during a period of about three hour with stirring, the temperature being maintained approximately at 140° C. Any other suitable means for causing the materials to react at an elevated temperature may be employed, however. The aniline supply and the vessel containing the hot heptaldehyde form a closed system, and during the reaction an internal pressure of approximately 40 lbs. per square inch is built up. After all the aniline was run in the heating under pressure was continued for about 30 minutes, and the pressure apparatus then opened and the water formed in the reaction permitted to escape. A certain amount of oil is carried over by the water and may be collected. The residue was then heated continuously at 135 to 145° C. until the reaction product reached its maximum strength, which may require twenty hours, more or less. The reaction product under the conditions normally will absorb about 36–38 cc.

$$\frac{N}{10}$$

iodine solution per gram of reaction product. Even the residue before it was heated continuously at 135–145° C. showed a strength greater than that of the accelerator prepared from the same materials according to the method given in Patent 1,417,970, for while the accelerator of the patent normally absorbed less than 15 cc. of $$\frac{N}{10}$$

iodine solution per gram, that of the said residue ranged from about 16–18

$$\frac{N}{10}$$

iodine solution per gram. A convenient way of making the iodine test is as follows: 2 grams of a sample are weighed into a tared beaker, 20 cc. of benzol added and well stirred until the sample is completely in solution.

$$\frac{N}{10}$$

iodine solution in benzol is then added from a burette with vigorous stirring until the end point is reached. This is determined by adding a drop of the mixture to a drop of aqueous starch paste on a clean dry porcelain spotting plate until a distinct blue color is given to the starch solution. Good results have been obtained by running in say 15 cc. of iodine solution, stirring 2 minutes well, then testing for the end point. The iodine is then added in ½ cc. portion, stirring thoroughly for 30 seconds after each addition before the drop is tested with starch solution. When the starch solution shows blue continue stirring for 1 minute and retest with starch solution and if the color still remains this is regarded as the end point, otherwise another ½ cc. of the iodine solution is added and again tested as above. When the end point is apparently reached, ½ cc. is added in excess and stirred 1 min. as further proof. This excess should darken the starch considerably. For determining the end point it is necessary that freshly prepared starch solution be employed. This solution is made up by dissolving 3 grams of soluble starch in 100 cc. of boiling water. The end point itself is best determined by placing a drop of the starch solution in the depression in the spotting plate and adding approximately equal amounts of the benzol solution. The benzol solution should completely surround the starch solution drop. The result which is expressed as an index number or titer is calculated in accordance with the following formula:

$$\frac{cc. \frac{N}{10} \text{ benzol iodine} \times 10}{\text{weight of sample.}} = \text{titer.}$$

The condensation product obtained is a powerful accelerator having a strength several times as great as the accelerator prepared from the same materials according to the method given in the Cadwell patent before mentioned, and may be used for accelerating purposes without further treatment. In the above example the product was steam distilled to remove impurities, but while this step adds to the cost and powerfulness of the accelerator it is not essential, and may be omitted. The distillation was carried out by initially heating the product to a temperature of 105° C. and then steam distilling while maintaining it at this temperature. Any other suitable distillation method may be employed, however. The distillation was continued until a maximum improvement in the residue was obtained as shown by iodine absorption tests similar to those mentioned above, and in the example given required an amount of steam to be run through the product equivalent to about 1700 lbs. of water. The aqueous distillate contains some steam volatile material, particularly aniline, which may be recovered from the distillate. The residue after distillation was about 434 lbs. of a condensation product which has been found to be about five times as powerful as the material prepared according to the method given in the Cadwell patent before mentioned. This residue normally will absorb about 53–60 cc. of $$\frac{N}{10}$$

iodine solution. It is pointed out that by the prior methods the materials are initially brought together at ordinary temperatures and kept cool during the reaction, or they react merely in the presence of the heat generated by the reaction.

In the example above given amounts equivalent to two molecular weights of heptaldehyde and one of aniline were employed, but excellent results may be obtained by the use of one molecular weight of the heptaldehyde for each molecular weight of aniline. For example 410 lbs. of commercial heptaldehyde and 310 lbs. of aniline were condensed substantially in the manner just described to yield after steam distillation about 465 lbs. of condensation product having a very high accelerating quality.

It will thus be seen that an accelerator having an iodine absorption value of substantially 16–60 cc. $\frac{N}{10}$ iodine solution per gram of accelerator can be produced from the reaction of heptaldehyde and aniline according to the process of this invention.

The reaction product prepared in any of the ways above described provides a cheap, very powerful accelerator and it does not cause burning on the mixing mill during compounding of the rubber. Due to the strength of the accelerator such a small proportion of it is required that weighing errors in compounding are liable to result, particularly when making small mixes. To avoid this trouble the condensation product may be diluted with a suitable material which is inert to the accelerator, and we have found that substances such as light spindle oil, Nujol oil, aniline, and undecylenic acid anilide may be used for this purpose. However, any other suitable inert materials may be employed. The product as prepared according to the first example is soluble, either before or after steam distillation, in all of the substances mentioned. The product obtained in accordance with the second example is also soluble after steam distillation in all of the solvents mentioned, but before distillation it is soluble only in the aniline and undecylenic acid anilide of the solvents mentioned, probably by reason of excess of aniline present in the product before distillation.

As an example of the use of the new product for the acceleration of vulcanization the following is given. 100 parts of rubber, 10 parts of zinc oxide, 3 parts of sulphur, and .1 part of the reaction product as above prepared are mixed on the rolls in the usual manner and vulcanized for 60 minutes in a mold under 40 lbs. steam pressure. The product is a well vulcanized rubber. Good results have also been obtained with the use of lower steam pressures, such as about 30 lbs. While the accelerator works best in the presence of zinc oxide in the vulcanizable compound it can be used without the zinc oxide. It can be used to advantage in compounded stocks and in stocks that are vulcanized in the open air or in steam.

As above pointed out, instead of running the aniline into the hot heptaldehyde, good results may be obtained by running the heptaldehyde into hot aniline, or both chemicals may be heated before mixing. Either commercial or chemically pure heptaldehyde may be employed in the process with good results. The commercial heptaldehyde employed contains some organic acid as an impurity, but a moderate amount of such acid is not harmful and in fact seems to aid the condensation. The process gives good results with reaction temperatures above 100° C. and as high as 200° C., but better ones are obtained at temperatures between 120° and 150° C., preferably between 135 and 145° C. It will be noted that in the vulcanizing example given an extremely small proportion of the accelerator gives a good vulcanization and the proportion may be reduced still further with a resulting well vulcanized product.

As a further example of the invention heptaldehyde and ammonia may be condensed to produce a good yield of a powerful accelerator of vulcanization having a not unpleasant odor and particularly adapted for vulcanization of stocks in air. To accomplish this, 114 parts of heptaldehyde are maintained at a temperature of 135° C. in a vessel provided with a condenser, and approximately an equimolecular amount of dry ammonia gas is run slowly through the hot heptaldehyde. A reaction occurs and a certain amount of water, heptaldehyde and reaction products distills through the condenser and is collected. After about three quarters of the ammonia has been added, the water is separated from the non-aqueous layer of the distillate and the non-aqueous layer is returned to the reaction mixture. Thereafter the remaining amount of the ammonia is added and the reaction mixture is heated from 2 to 4 hours at 120° to 140° C. The resulting product possesses the desirable qualities above described.

As another example of the invention, using similar procedure to that already set forth, acetaldehyde and aniline were condensed at elevated temperatures, the acetaldehyde in this instance being run into the hot aniline, and a superior accelerator was obtained. In a similar manner butylaldehyde was run into hot aniline and yielded a better accelerator than that obtained when the condensation is carried out under ordinary temperatures. Heptaldehyde and ethylamine, heptaldehyde and para toluidine, heptaldehyde and benzidine, heptaldehyde and paraphenylene diamine, heptaldehyde and para-amino dimethylaniline, heptaldehyde and urea, aldol and aniline, and nonaldehyde and aniline, have been condensed by the use of the methods above described to produce superior accelerators. The process is of particular value in the condensation of open chain aldehydes and basic nitrogenous materials, and shows a specially marked improvement in the condensation products of heptaldehyde and such materials, particularly those of heptaldehyde and aromatic amines such as aniline. If strong basic nitrogeneous material such as ammonia or ethyl amine is employed it is believed that better results are obtained if an appropriate acid is used to reduce the basicity of the nitrogeneous product. While in the first and second examples given the product has been condensed under pressure, excellent results have also been obtained by condensing the materials at or about atmospheric pressures.

While it is an essential to the invention that the reaction be begun and carried out at temperatures considerably above those formerly employed, it is again pointed out that a greatly improved result may be obtained by the use of temperatures above 100° C. and as high as 200° C., although better results are obtained between 120° and 150° C., and preferably at 135° to 145° C. The process may be also modified in other details and we therefore do not desire to limit the invention otherwise than as set forth in the appended claims.

Having thus described our invention, what we claim and desire to protect by Letters Patent is:

1. A method of making condensation products for the acceleration of vulcanization in rubber, which comprises initially mixing an aldehyde and a basic nitrogenous material at least one of which has an initial temperature above 100° C., said temperature being maintained throughout the mixing.

2. A method of making condensation products for the acceleration of vulcanization in rubber, which comprises causing an aldehyde and a basic nitrogenous material to substantially initially and continuingly react with each other at temperatures between 100° C. and 200° C., one of said ingredients being gradually added to the other.

3. A method of making condensation products for the acceleration of vulcanization in rubber, which comprises causing a preformed aldehyde and an ammonia type base to substantially initially and continuingly react each other at temperatures above 100° C.

4. A method of making condensation products for the acceleration of vulcanization in rubber, which comprises causing an aldehyde and a basic nitrogenous material to substantially initially and continuingly react at temperatures between 100° C. and 200° C. and at superatmospheric pressure.

5. A method of making condensation products for the acceleration of vulcanization in rubber, which comprises causing an aldehyde and a basic nitrogenous material to substantially initially and continuingly react at a temperature of approximately 135° C.–145° C.

6. A method of making condensation products for the acceleration of vulcanization in rubber, which comprises causing a preformed aldehyde and a basic nitrogenous material to react at an initial and continuing temperature above 100° C. and at superatmospheric pressure.

7. A method of making condensation products for the acceleration of vulcanization in rubber, which comprises causing an aldehyde and a basic nitrogenous material to react at an initial and continuing temperature between 100° C. and 200° C.

8. A method of making condensation products for the acceleration of vulcanization in rubber, which comprises causing a preformed open chain aldehyde and a basic nitrogenous material to react at an initial an continuing temperature above 120° C.

9. A method of making condensation products for the acceleration of vulcanization in rubber, which comprises causing heptaldehyde and a basic nitrogenous material to react at an initial and continuing temperature above 100° C.

10. A method of making condensation products for the acceleration of vulcanization in rubber, which comprises causing heptaldehyde and a basic nitrogenous material to react at an initial and continuing temperature between 120 and 150° C.

11. A method of making condensation products for the acceleration of vulcanization in rubber, which comprises causing an aldehyde and an amine to react at an initial and continuing temperature between 120 and 150° C.

12. A method of making condensation products for the acceleration of vulcanization in rubber, which comprises causing an open chain aldehyde and an aromatic amine to react at an initial and continuing temperature above 100° C.

13. A method of making condensation products for the acceleration of vulcanization in rubber, which comprises causing an aldehyde and aniline to react at an initial and continuing temperature between 100 and 200° C.

14. A method of making condensation products for the acceleration of vulcanization in rubber, which comprises causing less than three mols of a preformed aldehyde to react with one mol of a basic nitrogenous material at an initial and continuing temperature above 100° C.

15. A method of making condensation products for the acceleration of vulcanization in rubber, which comprises causing at least one mol of an open chain aldehyde to react with one mol of a basic nitrogenous material at an initial and continuing temperature between 100° and 200° C.

16. A method of making condensation products for the acceleration of vulcanization in rubber, which comprises causing two mols of heptaldehyde to react with one mol of aniline at an initial and continuing temperature of approximately 135°–145° C.

17. A method of making condensation products for the acceleration of vulcanization in rubber, which comprises causing at least one mol of heptaldehyde to react with one mol of an aromatic amine at an initial and continuing temperature of 120°–150° C.

18. A method of making condensation products for the acceleration of vulcanization in rubber, which comprises condensing a preformed aldehyde and a basic nitrogenous material while continously maintaining a reaction temperature above 100° C.

19. A method of making condensation products for the acceleration of vulcanization in rubber, which comprises condensing an aliphatic aldehyde and an amine while continuously maintaining a reaction temperature between 100° and 200° C.

20. A method of making condensation products for the acceleration of vulcanization in rubber, which comprises condensing an aldehyde and a basic nitrogenous material at an initial temperature of 100 to 200° C., maintaining said temperature until the reaction is completed, and steam distilling the product.

21. A method of making condensation products for the acceleration of vulcanization in rubber, which comprises condensing an aliphatic aldehyde and a basic nitrogenous material at an initial temperature of 120 to 150° C., maintaining said temperature until the reaction is completed, and steam distilling the product.

22. A method of making condensation products for the acceleration of vulcanization in rubber, which comprises condensing an aliphatic aldehyde and an amine at an initial temperature of 100 to 200° C., maintaining said temperature until the reaction is completed, and steam distilling the product.

23. A method of making condensation products for the acceleration of vulcanization in rubber, which comprises condensing heptaldehyde and aniline at an initial temperature of 135 to 145° C., maintaining said temperature until the reaction is completed, and steam distilling the product.

24. A method of making condensation products for the acceleration of vulcanization in rubber, which comprises mingling an aldehyde and a basic nitrogenous material while maintaining the mixture at a temperature of 100 to 200° C. throughout the reaction, heating the reaction product at 100 to 200° C. until it attains the desired strength, and finally steam distilling the product.

25. A method of making condensation products for the acceleration of vulcanization in rubber, which comprises mingling heptaldehyde and aniline, at least one of said materials being initially heated to a temperature of 120 to 150° C., continuingly heating the reaction product at a temperature of 120 to 150° C. until it attains maximum strength by such heating, and finally steam distilling the product until a further maximum increase in strength has been obtained.

26. As an accelerator of vulcanization, a condensation product of an aldehyde and a basic nitrogenous material condensed at an initial and continuing temperature between 100 to 200° C.

27. As an accelerator of vulcanization, a condensation product of an aliphatic aldehyde and an amine condensed at a substantially initial and continuing temperature between 120° and 150° C.

28. As an accelerator of vulcanization, a condensation product of an aliphatic aldehyde and an aromatic amine condensed at an initial and continuing temperature above 100° C.

29. As an accelerator of vulcanization, a condensation product of heptaldehyde and a basic nitrogenous material condensed at an initial and continuing temperature between substantially 100 and 200° C.

30. As an accelerator of vulcanization, a condensation product of heptaldehyde and aniline condensed at an initial and continuing temperature of approximately 135°–145° C.

31. As an accelerator of vulcanization, the steam distilled product of the reaction of an aldehyde and a basic nitrogenous material at a continuing temperature of 100° to 200° C.

32. As an accelerator of vulcanization, the steam distilled product of the reaction of an open chain aldehyde and a basic nitrogenous material at a continuing temperature of 120° to 150° C.

33. As an accelerator of vulcanization, the steam distilled product of the reaction of an aldehyde and aniline at a continuing temperature of 120° to 150° C.

34. As an accelerator of vulcanization, the steam distilled product of the reaction of heptaldehyde and a basic nitrogenous material at a continuing temperature of 100 to 200° C.

35. As an accelerator of vulcanization, the steam distilled product of the reaction of the heptaldehyde and an amine at a continuing temperature of 120° to 150° C.

36. As an accelerator of vulcanization, the steam distilled product of the reaction of heptaldehyde and aniline at a continuing temperature of 135° to 145° C.

37. As an accelerator of vulcanization, a condensation product of heptaldehyde and aniline adapted to absorb 16–60 cc. of $\frac{N}{10}$ iodine solution per gram which product is substantially identical with that prepared by causing heptaldehyde and aniline to react at an initial and continuing temperature above 100° C.

38. As an accelerator of vulcanization, a condensation product of heptaldehyde and aniline adapted to absorb substantially 53–60 cc. $\frac{N}{10}$ iodine solution per gram which product is substantially identical with that prepared by causing heptaldehyde and aniline to react at an initial and continuing temperature above 120° C.

39. As an accelerator of vulcanization, a condensation product of heptaldehyde and aniline adapted to absorb over 16 cc. $\frac{N}{10}$ iodine solution per gram which product is substantially identical with that prepared by causing heptaldehyde and aniline to react at an initial and continuing temperature above 100° C.

40. As an accelerator of vulcanization, a condensation product of an aldehyde and an amine adapted to absorb over 16 cc. $\frac{N}{10}$ iodine solution per gram, which product is substantially identical with that prepared by causing the aldehyde and amine to react at an initial and continuing temperature above 100° C.

41. As an accelerator of vulcanization, a condensation product of an open chain aldehyde and an aromatic amine adapted to absorb over 16 cc. $\frac{N}{10}$ iodine solution per gram, which product is substantially identical with that prepared by causing the aldehyde and amine to react at an initial and continuing temperature above 100° C.

42. As an accelerator of vulcanization, a condensation product of an aldehyde and aniline adapted to absorb over 16 cc. $\frac{N}{10}$ iodine solution per gram, which product is substantially identical with that prepared by causing the aldehyde and amine to react at an initial and continuing temperature above 100° C.

Signed at New York, county of New York, and State of New York, this 14th day of October, 1925.

SIDNEY M. CADWELL.
ALEXANDER THEODOROVICH MAXIMOFF.